Dec. 27, 1938. H. D. GEYER 2,141,648

PERIPHERAL RESILIENT MOUNT FOR ELECTRIC MOTORS

Filed Sept. 12, 1935

INVENTOR
Harvey D. Geyer
BY Spencer Hardman & Fehr
HIS ATTORNEYS

Patented Dec. 27, 1938

2,141,648

UNITED STATES PATENT OFFICE 2,141,648

PERIPHERAL RESILIENT MOUNT FOR ELECTRIC MOTORS

Harvey D. Geyer, Dayton, Ohio, assignor to General Motors Corporation, Detroit, Mich., a corporation of Delaware Application September 12, 1935, Serial No. 40,227

3 Claims. (Cl. 248—26)

This invention relates to improvements in resilient mounting units for the mounting of electric motors and other mechanical devices upon their supporting bases.

An object of this invention is to provide a very simple, inexpensive and efficient mounting unit which will permit a considerable amount of rotary deflection in the direction of torque reaction of the motor but only a relatively small degree of deflection under the weight load supported thereby. This is accomplished by providing that the torque reaction put the resilient rubber elements under shearing stress while the weight load is sustained by compression on the rubber elements.

A further feature of the mounting unit of this invention is the off-set relation between the two metal plates fixed to the supporting base and supported device respectively, and the intermediate floating metal plate which carries the loads from one resilient rubber element to the other. This off-set relation greatly simplifies the attaching means and facilitates the attachment of the two fixed metal plates to the base and supported device respectively, and also provides a mechanical leverage for the stresses in the two rubber elements whereby any desired greater deflections may be obtained without making the rubber excessively soft. In other words, when the rubber elements undergo shearing stresses due to torque reaction (in the illustrated case of an electric motor) the floating plate swings at an angle relative to the two fixed plates and thus serves as a sort of pivot link to very materially increase the amount of deflection between the base and the supported device.

Further objects and advantages of the present invention will be apparent from the following description, reference being had to the accompanying drawing wherein a preferred embodiment of the present invention is clearly shown.

In the drawing:

Fig. 3 is a view looking in the direction of arrow 3 in Fig. 4 and shows one mount in side elevation.

Fig. 4 is taken on the broken line 4—4 of Fig. 3, and shows on the left side thereof a section thru the center line of the portion fixed to the base and on the right side thereof a section thru the center line of one screw for fixing the mount to the motor.

Similar reference characters refer to similar parts throughout the several views.

Figure 1:
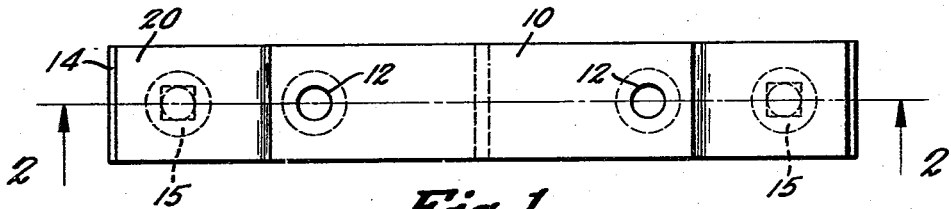
Fig. 1 is a face view of a double mounting unit made according to this invention.
Figure 2:
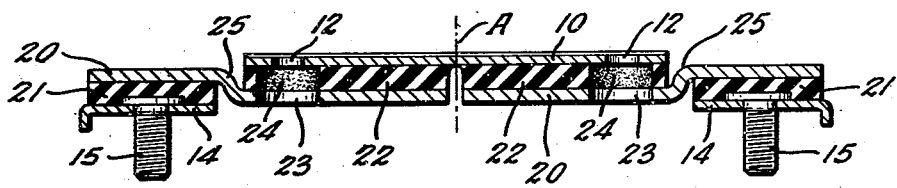
Fig. 2 is a section on line 2—2 of Fig. 1.
Figure 3:
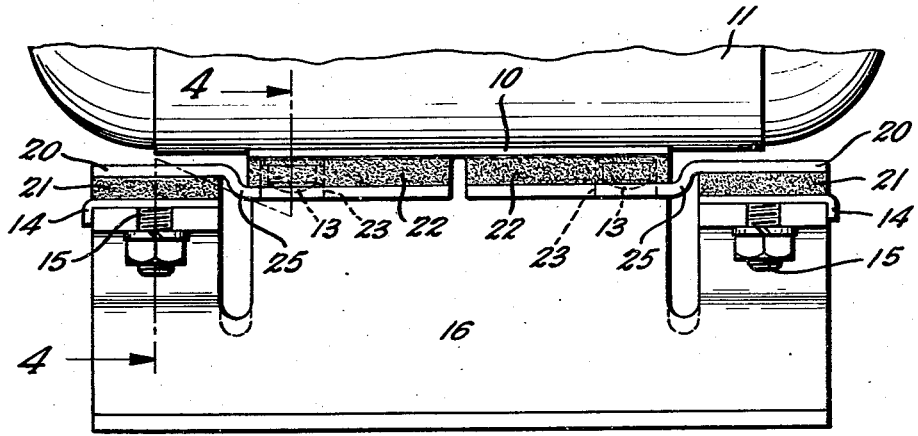
Figs. 3 and 4 show how an electric motor may be mounted upon its base by two mounting units as shown in Figs. 1 and 2.
Figure 4:
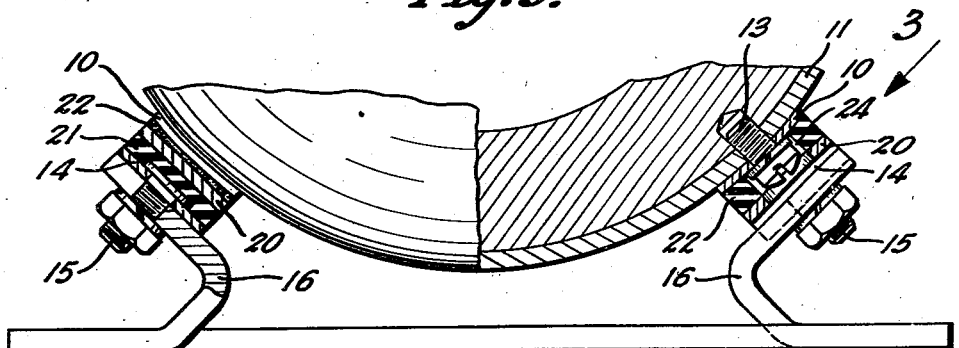

The double mounting unit shown in Figs. 1 and 2 comprises a metal plate 10, preferably steel, formed to fit the curvature of the motor housing 11 and having two screw holes 12 therein for receiving the attachment screws 13 which fix plate 10 rigidly upon the housing 11. Two metal plates 14 are located off-set from the ends of plate 10, and each plate 14 has a headed screw 15 welded or otherwise suitably fixed thereto for fixing these plates 14 to the supporting base 16. Two intermediate floating metal plates 20 overlap plates 10 and 14, as clearly shown in Fig. 2, and two pairs of resilient rubber blocks 21 and 22 are surface bonded by vulcanization in situ to the metal plates 10, 14, and 20 and thereby form an integral unit. In making this double unit, the five metal plates are properly fixed within the vulcanizing mold as metal inserts with the uncured rubber blanks located therebetween and thus the entire double unit is simply and economically made in one vulcanizing operation. The inserts 14 are held properly located by the projecting screws 15 while the insert plate 10 and also the two insert plates 20 are held properly located by a mold core pin (not shown) which extends thru the holes 23 in plates 20 and also has a reduced diameter extending thru the holes 12 in plate 10. Of course these core pins also mold the recesses 24 in the rubber elements 22. Holes 23 and recesses 24 are provided to permit the heads of screws 13 to pass therethru in order to clamp directly against plate 10 (see the right side of Fig. 4). This double unit of Figs. 1 and 2 may be used as such as shown in Figs. 3 and 4, or it may be simply cut in two parts at the center line A and thus provide two single mounting units which may be located at distances farther apart than as shown in Figs. 3 and 4, or used in any other desired positions.

To mount the electric motor 11 upon its supporting base 16 by means of the resilient units of this invention it is necessary simply to drill and tap threads in the housing 11 for the attachment screws 13 and thus these resilient mounts may be simply located in any desired position about the periphery of the housing 11. When the supporting base 16 is below the motor preferably these mounts are located on each side about 45 degrees from the center line, as clearly shown in Fig. 4.

In operation, the weight or down load is taken by a direct compression of the rubber pads 22 and this down load is transmitted by the metal links 20 across to the rubber pads 21 which are thereby also put under compression (see Fig. 3) but with a slight angular movement of the metal links 20 due to the off-set between pads 22 and pads 21. The power torque reaction of the motor housing 11 is taken by a twisting shearing distortion in both the rubber pads 22 and 21 since these are arranged tangentially to the torque reaction, that is, parallel to the direction of torque movement of the motor housing 11 (see Fig. 4). Under torque reaction it will be noted that each metal link 20 will move angularly substantially within its plane due to the off-set between the center of pad 22 and the center of pad 21, and thus each link 20 will function similarly to a shackle link pivoted at the center of pad 22 at one end and at the center of pad 21 at its other end (see Fig. 3). The resistance of the rubber pads 22 and 21 to such twisting shearing distortion limits the rotational movement of the motor housing 11 under torque reaction. It will now be obvious that this shackle action of the metal links 20 permits a greatly increased rotary deflection of the motor housing and with only a slight twisting distortion of the rubber pads 22 and 21, while at the same time the vertical deflection of the motor housing, due to vertical loads such as weight, is kept relatively small due to such loads being taken by a direct compression of the flat rubber pads 22 and 21 as described above. Preferably, but not necessarily, the metal links 20 each has a slight off-set 25 between its two ends in order to bring its effective pivot point on the rubber pad 21 more nearly in the same plane with its effective pivot point on rubber pad 22. (See Fig. 3.)

Obviously the above-described single mounting units will function in a like manner and may be used for mounting electric motors or any other mechanical devices where it is desired to permit a considerable degree of deflection in one direction namely, substantially in the plane of the metal link 20, but only a relatively small degree of deflection in a direction perpendicular to the plane of the metal link 20.

While the embodiment of the present invention as herein disclosed, constitutes a preferred form, it is to be understood that other forms might be adopted, all coming within the scope of the claims which follow.

What is claimed is as follows:

1. In an electric motor having a base bracket and a metal housing surrounding the motor shaft, in combination, resilient rubber mounts for supporting said housing upon said bracket, said mounts each comprising: a metal plate fixed to said housing, a second metal plate fixed to said bracket, an intermediate floating metal plate, and two resilient rubber layers bonded by vulcanization in situ to opposite sides of said floating plate and to said first and second metal plates respectively, said two rubber layers being disposed substantially perpendicular to a radial line through the axis of the motor shaft whereby the torque reaction on the motor housing is resiliently carried by shear in said rubber layers.

2. In an electric motor having a base bracket and a metal housing surrounding the motor shaft, in combination, resilient rubber mounts for supporting said housing upon said bracket, said mounts each comprising: a metal plate fixed to said housing, a second metal plate fixed to said bracket, and offset in an axial direction from said first metal plate, an intermediate floating metal plate overlapping and spaced from but adjacent to both of said fixed metal plates and two resilient rubber layers bonded by vulcanization in situ to opposite sides of said floating plate and to said two fixed metal plates respectively, said rubber layers being arranged to carry the torque reaction by shear therein and the motor weight by compression.

3. A vibration-damping mounting unit for supporting a vibratable device upon its supporting base, comprising: a metal plate having means for rigidly fixing same to the supporting base, a second metal plate located substantially parallel to but offset from said first plate and having means for rigidly fixing same to the vibratable device, a third floating metal plate lying between and overlapping but spaced from both of said off-set plates, and two resilient rubber blocks surface bonded by vulcanization in situ to opposite sides of said third plate and to the adjacent sides of said two off-set plates respectively.

HARVEY D. GEYER.